(12) United States Patent
Negulescu

(10) Patent No.: US 11,334,828 B2
(45) Date of Patent: May 17, 2022

(54) AUTOMATED DATA MAPPING WIZARD FOR ROBOTIC PROCESS AUTOMATION (RPA) OR ENTERPRISE SYSTEMS

(71) Applicant: UiPath, Inc., New York, NY (US)

(72) Inventor: Cristian Negulescu, Bucharest (RO)

(73) Assignee: UIPATH, INC., New York, NY (US)

( * ) Notice: Subject to any disclaimer, the term of this patent is extended or adjusted under 35 U.S.C. 154(b) by 188 days.

(21) Appl. No.: 16/698,035

(22) Filed: Nov. 27, 2019

(65) Prior Publication Data

US 2021/0158256 A1      May 27, 2021

(51) Int. Cl.

| | | |
|---|---|---|
| *G06Q 10/08* | (2012.01) | |
| *G06F 9/54* | (2006.01) | |
| *G06F 16/9032* | (2019.01) | |
| *G06F 9/455* | (2018.01) | |
| *G06Q 10/06* | (2012.01) | |
| *B25J 13/00* | (2006.01) | |
| *G06Q 30/00* | (2012.01) | |
| *G06F 16/23* | (2019.01) | |
| *G06Q 10/10* | (2012.01) | |
| *G06F 16/2455* | (2019.01) | |

(52) U.S. Cl.
CPC ...... *G06Q 10/06316* (2013.01); *B25J 13/006* (2013.01); *G06F 16/23* (2019.01); *G06Q 30/01* (2013.01); *G06F 16/2358* (2019.01); *G06F 16/24553* (2019.01); *G06Q 10/06* (2013.01); *G06Q 10/067* (2013.01); *G06Q 10/0633* (2013.01); *G06Q 10/0834* (2013.01); *G06Q 10/101* (2013.01); *G06Q 30/016* (2013.01)

(58) Field of Classification Search
CPC ........... G06Q 10/06316; G06Q 10/067; G06Q 10/0834; G06Q 10/0633; G06Q 10/06; G06Q 10/00; G06Q 10/101; G06Q 30/01; G06Q 30/016; G06F 16/23; G06F 16/24553; G06F 16/2358; G06F 21/45; B25J 13/006; B25J 9/1674
See application file for complete search history.

(56) References Cited

U.S. PATENT DOCUMENTS

| | | | |
|---|---|---|---|
| 8,943,461 | B2 | 1/2015 | Patrascu et al. |
| 9,817,967 | B1 * | 11/2017 | Shukla .................. B25J 9/1674 |
| 10,354,225 | B2 | 7/2019 | Sharma et al. |
| 10,853,097 | B1 * | 12/2020 | Kakhandiki ....... G05B 19/4155 |

(Continued)

OTHER PUBLICATIONS

Alok Mani Tripathi, Learning Robotic Process Automation, Mar. 2018, [Retrieved on Aug. 17, 2021]. Retrieved from the internet: < URL: https://book.akij.net/eBooks/2018/November/5be2a5c7bc9bd/ Sanet.st_Learning_Robotic_Proc.pdf> 349 Pages (1-349) (Year: 2018).*

(Continued)

*Primary Examiner* — Anibal Rivera
(74) *Attorney, Agent, or Firm* — Volpe Koenig

(57) ABSTRACT

A computing device may execute a wizard component for a customer resource management (CRM) component. The wizard component may generate a match result between a data model and fields in the CRM component. The wizard component may generate a robotic process automation (RPA) workflow based on the match result. The RPA workflow may add or update data of the fields of the CRM component based on a RPA activity component.

18 Claims, 9 Drawing Sheets

(56) References Cited

U.S. PATENT DOCUMENTS

2015/0081841 A1    3/2015  Pino et al.
2020/0401431 A1*  12/2020  Rashid .................... G06F 40/14

OTHER PUBLICATIONS

Institute for Robotic Process Automation, Introduction to Robotic Process Automation a Primer, 2015, [Retrieved on Jan. 6, 2022]. Retrieved from the internet: <URL: https://www.irpaai.com/wp-content/uploads/2015/05/Robotic-Process-Automation-June2015.pdf> 35 Pages (1-35) (Year: 2015).*

Mykolas Romeris, Changing Patterns in Process Management and Improvement: Using RPA and RDA in Non-Manufacturing Organization, 2018, [Retrieved on Jan. 6, 2022], Retrieved from the internet: <URL: https://d1wqtxts1xzle7.cloudfront.net/57509250/15-with-cover-page-v2.pdf> 15 Pages (251-264) (Year: 2018).*

Creating Multiple Mappings from One Informatica Mapping Template 2009.

Yinxue Shi, et al. Goal-driven Workflow Generation based on AI planning.

Salesforce Developers. Introducing Lightning Platform REST API. https://developer.salesforce.com/docs/atlas.en-us.api_rest.meta/api_rest/intro_what_is_rest_api.htm. Retrieved Nov. 27, 2019.

Service Now. Developers. https://developer.servicenow.com/app.do#!/home. Retrieved Nov. 27, 2019.

* cited by examiner

FIG. 3B

| UI Get Data wizard | | | | – ☐ X |
|---|---|---|---|---|
| Command | Result | Information | | |
| Object Name | | ☐ ID | | |
| incident | | | | Get Data |
| Filter result: | op | | | |

| | CI | Display_Name | Parameter_Name | Type |
|---|---|---|---|---|
| ▲ | ☐ | Reopen count | reopen_count | integer |
| | ☐ | Last reopened at | reopened_time | glide_date_time |
| | ☐ | Opened | opened_at | glide_date_time |
| | ☐ | Opened by | opened_by | reference [sys_user] |
| | ☐ | Last reopened by | reopened_by | reference [sys_user] |

Get Data wizard

Command | Result | Information

Results for the command:

Result displayed for this command:https://dev58308.service-now.com/api/now/table/incident?sysparm_action=getRecords&sysparm_exclude_reference_link=true&sysparm_query=active=true^opened_at>2019-06-01

Number of rows: 10

| Description | sys_id | assignment_group | short_description | opened_at | number | assignment_group |
|---|---|---|---|---|---|---|
| | 7e3ac6dcdb0a33002 | | | 2019-06-11 05:35:19 | INC0010067 | |
| Lung | 2216f6d0dbca33002 | | Scurt | 2019-06-11 08:46:59 | INC0010068 | |
| | 3892875cdb4a33002 | | | 2019-06-11 09:41:29 | INC0010069 | |
| | 4992c7d0dbca33002 | | | 2019-06-11 09:41:30 | INC0010070 | |
| | 2444c7d0dbca33002 | | | 2019-06-11 09:48:50 | INC0010071 | |
| Lung | 5693b874db4a73002 | | Scurt | 2019-06-12 12:33:46 | INC0010097 | Database |
| Lung | d404b4b4db4a73002 | Database | Scurt | 2019-06-12 12:35:32 | INC0010099 | 287ee6fea9fe198100 |
| Mare | 9c04b4f4db4b73002 | Hardware | Modified 1 | 2019-06-12 12:35:33 | INC0010100 | 8a5055c9c61122780 |
| Lung max | 6d68e511db0233002 | Database | Scurt | 2019-06-14 05:41:24 | INC0010101 | 287ee6fea9fe198100 |
| Modified 5 | f1682911db0233002 | Hardware | Modified 5 | 2019-06-14 05:41:25 | INC0010102 | 8a5055c9c61122780 |

AUTOMATED DATA MAPPING WIZARD FOR ROBOTIC PROCESS AUTOMATION (RPA) OR ENTERPRISE SYSTEMS

BACKGROUND

Robotic process automation (RPA) may automate repetitive operations, functions, or workflows on enterprise platforms, virtual machine (VM) configurations, remote desktops, cloud computing, desktop applications, mobile applications, or the like. RPA for customer relationship/resource management (CRM) components, platforms, applications, or tools may be desirable for automatically creating a workflow to add, fetch, change, update, alter, modify, or the like data from the CRM components. A RPA process may add information or data automatically into CRM tools using a matching algorithm. However, this may require that information fields from source applications match or correspond to CRM fields. Current RPA configurations may also require intelligence to accept incorrect information.

Moreover, current RPA configurations of codes or drag-and-drop technology may be able to create a RPA workflow for updating information or data in a CRM component(s). This may require understanding of objects in a CRM component(s) for RPA development that may be time or resource intensive. Thus, it may be desirable to create a workflow automatically for adding, fetching, changing, updating, altering, modifying, or the like of information or data of CRM components or tools.

SUMMARY

A method and apparatus may be configured for automatically creating a robotic process automation (RPA) workflow for adding, fetching, changing, updating, altering, modifying, or the like of information or data of customer relationship/resource management (CRM) components, platforms, applications, or tools through a wizard component(s) or module(s). Sequencing, matching, field matching, or error correction may be utilized by a wizard component(s) or module(s) for automatic RPA workflow configurations.

BRIEF DESCRIPTION OF THE DRAWING(S)

A more detailed understanding may be had from the following description, given by way of example in conjunction with the accompanying drawings, wherein like reference numerals in the figures indicate like elements, and wherein:

FIGS. 3A and 3B are illustrations of wizard components configured to automatically create RPA workflows to get information or data from CRM components;

FIG. 4 is an illustration of information fetched by a wizard component(s) configured to automatically create a RPA workflow to get information or data of a CRM component(s);

FIG. 5 is an illustration of information results by a wizard component(s) configured to automatically create a RPA workflow to get information or data of a CRM component(s)

DETAILED DESCRIPTION

For the methods and processes described below the steps recited may be performed out of sequence in any order and sub-steps not explicitly described or shown may be performed. In addition, "coupled" or "operatively coupled" may mean that objects are linked but may have zero or more intermediate objects between the linked objects. Also, any combination of the disclosed features/elements may be used in one or more embodiments. When using referring to "A or B", it may include A, B, or A and B, which may be extended similarly to longer lists. When using the notation X/Y it may include X or Y. Alternatively, when using the notation X/Y it may include X and Y. X/Y notation may be extended similarly longer lists with the same explained logic.

Figure 1A:
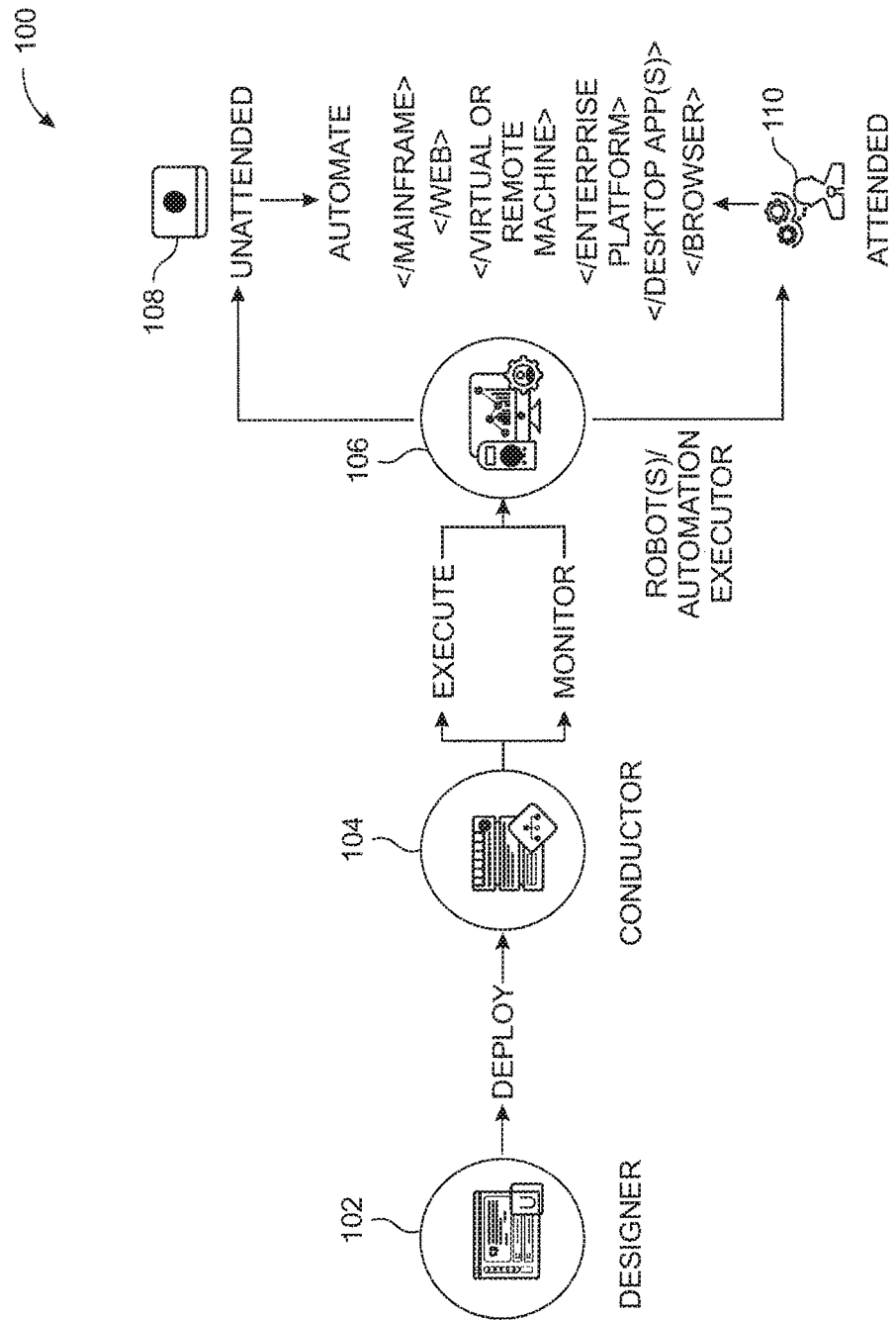
FIG. 1A is an illustration of robotic process automation (RPA) development, design, operation, or execution.

FIG. 1A is an illustration of robotic process automation (RPA) development, design, operation, or execution 100. Designer 102, sometimes referenced as a studio, development platform, development environment, or the like may be configured to generate code, instructions, commands, or the like for a robot perform or automate one or more workflows. From a selection(s), which the computing system may provide to the robot, the robot may determine representative data of the area(s) of the visual display selected by a user or operator. As part of RPA, shapes such as squares, rectangles, circles, polygons, freeform, or the like in multiple dimensions may be utilized for UI robot development and runtime in relation a computer vision (CV) operation or machine learning (ML) model.

Non-limiting examples of operations that may be accomplished by a workflow may be one or more of performing login, filling a form, information technology (IT) management, or the like. To run a workflow for UI automation, a robot may need to uniquely identify specific screen elements, such as buttons, checkboxes, text fields, labels, etc., regardless of application access or application development. Examples of application access may be local, virtual, remote, cloud, Citrix®, VMWare®, VNC®, Windows® remote desktop, virtual desktop infrastructure (VDI), or the like. Examples of application development may be win32, Java, Flash, hypertext markup language (HTML), HTML5, extensible markup language (XML), JavaScript, C #, C++, Silverlight, or the like.

A workflow may include, but are not limited to, task sequences, flowcharts, Finite State Machines (FSMs), global exception handlers, or the like. Task sequences may be linear processes for handling linear tasks between one or more applications or windows. Flowcharts may be configured to handle complex business logic, enabling integration of decisions and connection of activities in a more diverse manner through multiple branching logic operators. FSMs may be configured for large workflows. FSMs may use a finite number of states in their execution, which may be triggered by a condition, transition, activity, or the like. Global exception handlers may be configured to determine workflow behavior when encountering an execution error, for debugging processes, or the like.

A robot may be an application, applet, script, or the like, that may automate a UI transparent to an underlying operating system (OS) or hardware. At deployment, one or more robots may be managed, controlled, or the like by a conductor 104, sometimes referred to as an orchestrator. Conductor 104 may instruct or command robot(s) or automation executor 106 to execute or monitor a workflow in a mainframe, web, virtual machine, remote machine, virtual desktop, enterprise platform, desktop app(s), browser, or the like client, application, or program. Conductor 104 may act as a central or semi-central point to instruct or command a plurality of robots to automate a computing platform.

In certain configurations, conductor 104 may be configured for provisioning, deployment, configuration, queueing, monitoring, logging, and/or providing interconnectivity. Provisioning may include creating and maintenance of connections or communication between robot(s) or automation executor 106 and conductor 104. Deployment may include assuring the delivery of package versions to assigned robots for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robot(s) or automation executor 106 may be configured as unattended 108 or attended 110. For unattended 108 operations, automation may be performed without third party inputs or control. For attended 110 operation, automation may be performed by receiving input, commands, instructions, guidance, or the like from a third party component.

A robot(s) or automation executor 106 may be execution agents that run workflows built in designer 102. A commercial example of a robot(s) for UI or software automation is UiPath Robots™. In some embodiments, robot(s) or automation executor 106 may install the Microsoft Windows® Service Control Manager (SCM)-managed service by default. As a result, such robots can open interactive Windows® sessions under the local system account, and have the rights of a Windows® service.

In some embodiments, robot(s) or automation executor 106 may be installed in a user mode. These robots may have the same rights as the user under which a given robot is installed. This feature may also be available for High Density (HD) robots, which ensure full utilization of each machine at maximum performance such as in an HD environment.

In certain configurations, robot(s) or automation executor 106 may be split, distributed, or the like into several components, each being dedicated to a particular automation task or activity. Robot components may include SCM-managed robot services, user mode robot services, executors, agents, command line, or the like. SCM-managed robot services may manage or monitor Windows® sessions and act as a proxy between conductor 104 and the execution hosts (i.e., the computing systems on which robot(s) or automation executor 106 is executed). These services may be trusted with and manage the credentials for robot(s) or automation executor 106.

User mode robot services may manage and monitor Windows® sessions and act as a proxy between conductor 104 and the execution hosts. User mode robot services may be trusted with and manage the credentials for robots. A Windows® application may automatically be launched if the SCM-managed robot service is not installed.

Executors may run given jobs under a Windows® session (i.e., they may execute workflows). Executors may be aware of per-monitor dots per inch (DPI) settings. Agents may be Windows® Presentation Foundation (WPF) applications that display available jobs in the system tray window. Agents may be a client of the service. Agents may request to start or stop jobs and change settings. The command line may be a client of the service. The command line is a console application that can request to start jobs and waits for their output.

In configurations where components of robot(s) or automation executor 106 are split as explained above helps developers, support users, and computing systems more easily run, identify, and track execution by each component. Special behaviors may be configured per component this way, such as setting up different firewall rules for the executor and the service. An executor may be aware of DPI settings per monitor in some embodiments. As a result, workflows may be executed at any DPI, regardless of the configuration of the computing system on which they were created. Projects from designer 102 may also be independent of browser zoom level. For applications that are DPI-unaware or intentionally marked as unaware, DPI may be disabled in some embodiments.

Figure 1B:
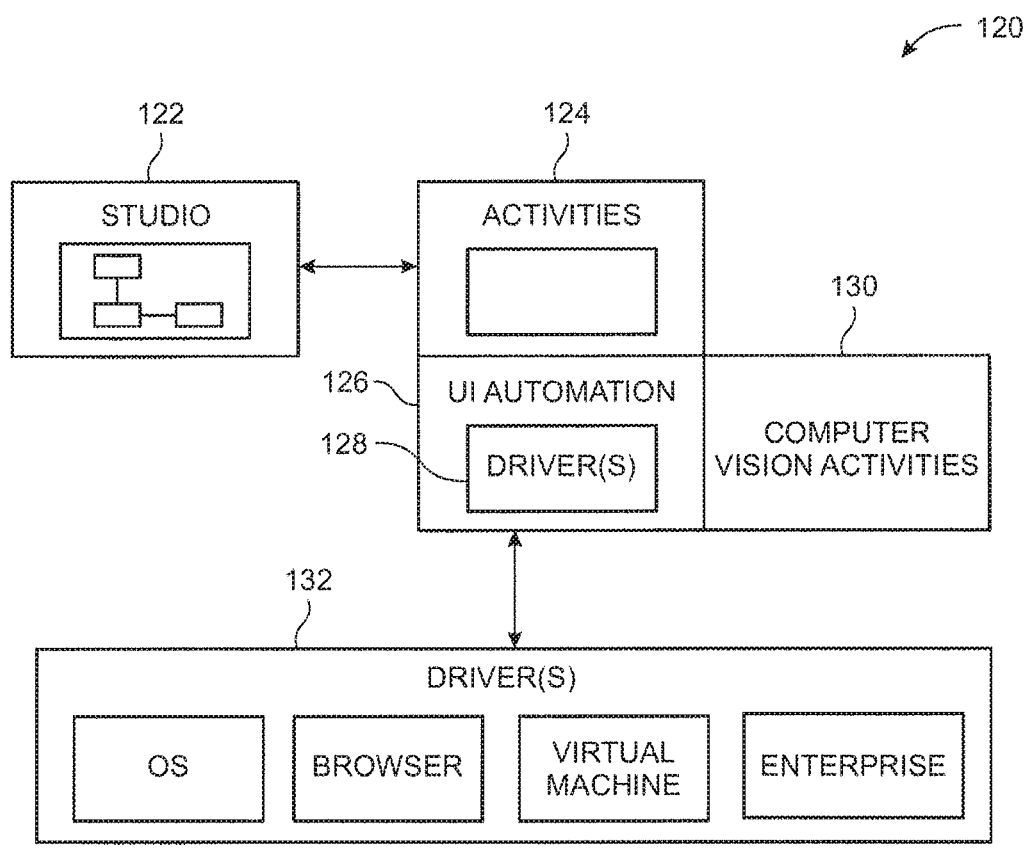
FIG. 1B is another illustration of RPA development, design, operation, or execution.
Figure 1C:
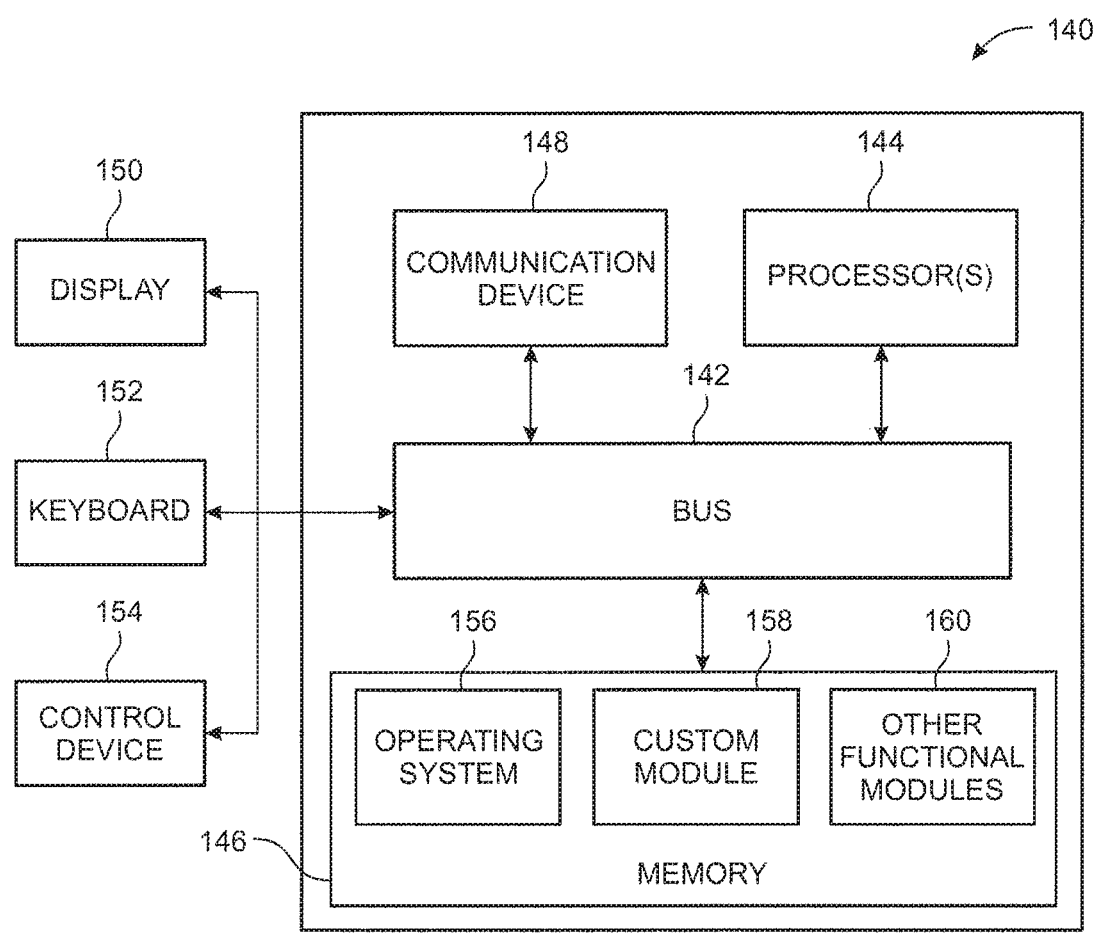
FIG. 1C is an illustration of a computing system or environment.

FIG. 1B is another illustration of RPA development, design, operation, or execution 120. A studio component or module 122 may be configured to generate code, instructions, commands, or the like for a robot to perform one or more activities 124. User interface (UI) automation 126 may be performed by a robot on a client using one or more driver(s) components 128. A robot may perform activities using computer vision (CV) activities module or engine 130. Other drivers 132 may be utilized for UI automation by a robot to get elements of a UI. They may include OS drivers, browser drivers, virtual machine drivers, enterprise drivers, or the like. In certain configurations, CV activities module or engine 130 may be a driver used for UI automation.

FIG. 10 is an illustration of a computing system or environment 140 that may include a bus 142 or other communication mechanism for communicating information or data, and one or more processor(s) 144 coupled to bus 142 for processing. One or more processor(s) 144 may be any type of general or specific purpose processor, including a central processing unit (CPU), application specific integrated circuit (ASIC), field programmable gate array (FPGA), graphics processing unit (GPU), controller, multi-core processing unit, three dimensional processor, quantum computing device, or any combination thereof. One or more processor(s) 144 may also have multiple processing cores, and at least some of the cores may be configured to perform specific functions. Multi-parallel processing may also be configured. In addition, at least one or more processor(s) 144 may be a neuromorphic circuit that includes processing elements that mimic biological neurons.

Memory 146 may be configured to store information, instructions, commands, or data to be executed or processed by processor(s) 144. Memory 146 can be comprised of any combination of random access memory (RAM), read only memory (ROM), flash memory, solid-state memory, cache, static storage such as a magnetic or optical disk, or any other types of non-transitory computer-readable media or combinations thereof. Non-transitory computer-readable media may be any media that can be accessed by processor(s) 144 and may include volatile media, non-volatile media, or the like. The media may also be removable, non-removable, or the like.

Communication device 148, may be configured as a frequency division multiple access (FDMA), single carrier FDMA (SC-FDMA), time division multiple access (TDMA), code division multiple access (CDMA), orthogonal frequency-division multiplexing (OFDM), orthogonal frequency-division multiple access (OFDMA), Global System for Mobile (GSM) communications, general packet radio service (GPRS), universal mobile telecommunications system (UMTS), cdma2000, wideband CDMA (W-CDMA), high-speed downlink packet access (HSDPA), high-speed uplink packet access (HSUPA), high-speed packet access (HSPA), long term evolution (LTE), LTE Advanced (LTE-A), 802.11x, Wi-Fi, Zigbee, Ultra-WideBand (UWB), 802.16x, 802.15, home Node-B (HnB), Bluetooth, radio frequency identification (RFID), infrared data association (IrDA), near-field communications (NFC), fifth generation (5G), new radio (NR), or any other wireless or wired device/transceiver for communication via one or more antennas. Antennas may be singular, arrayed, phased, switched, beamforming, beamsteering, or the like.

One or more processor(s) 144 may be further coupled via bus 142 to a display device 150, such as a plasma, liquid crystal display (LCD), light emitting diode (LED), field emission display (FED), organic light emitting diode (OLED), flexible OLED, flexible substrate displays, a projection display, 4K display, high definition (HD) display, a Retina© display, in-plane switching (IPS) or the like based display. Display device 150 may be configured as a touch, three dimensional (3D) touch, multi-input touch, or multi-touch display using resistive, capacitive, surface-acoustic wave (SAW) capacitive, infrared, optical imaging, dispersive signal technology, acoustic pulse recognition, frustrated total internal reflection, or the like as understood by one of ordinary skill in the art for input/output (I/O).

A keyboard 152 and a control device 154, such as a computer mouse, touchpad, or the like, may be further coupled to bus 142 for input to computing system or environment 140. In addition, input may be provided to computing system or environment 140 remotely via another computing system in communication therewith, or computing system or environment 140 may operate autonomously.

Memory 146 may store software components, modules, engines, or the like that provide functionality when executed or processed by one or more processor(s) 144. This may include an OS 156 for computing system or environment 140. Modules may further include a custom module 158 to perform application specific processes or derivatives thereof. Computing system or environment 140 may include one or more additional functional modules 160 that include additional functionality.

Computing system or environment 140 may be adapted or configured to perform as a server, an embedded computing system, a personal computer, a console, a personal digital assistant (PDA), a cell phone, a tablet computing device, a quantum computing device, cloud computing device, a mobile device, a fixed mobile device, a smart display, a wearable computer, or the like.

In the examples given herein, modules may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may be at least partially implemented in software for execution by various types of processors. An identified unit of executable code may include one or more physical or logical blocks of computer instructions that may, for instance, be organized as an object, procedure, routine, subroutine, or function. Executables of an identified module co-located or stored in different locations such that, when joined logically together, comprise the module.

A module of executable code may be a single instruction, one or more data structures, one or more data sets, a plurality of instructions, or the like distributed over several different code segments, among different programs, across several memory devices, or the like. Operational or functional data may be identified and illustrated herein within modules, and may be embodied in a suitable form and organized within any suitable type of data structure.

In the examples given herein, a computer program may be configured in hardware, software, or a hybrid implementation. The computer program may be composed of modules that are in operative communication with one another, and to pass information or instructions.

Figure 2:
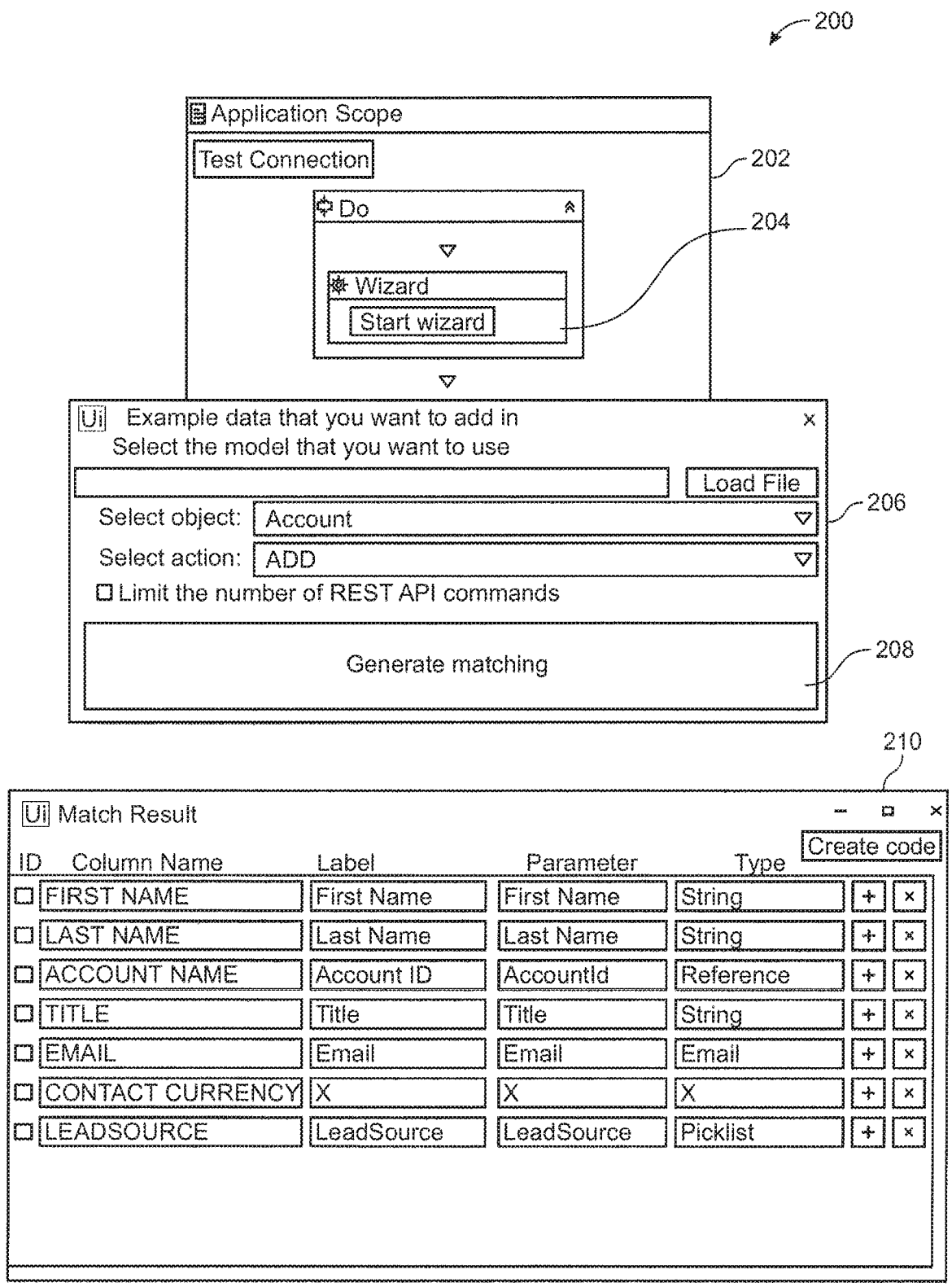
FIG. 2 is an illustration of a drag and drop configuration for a wizard component(s) to automatically create a RPA workflow to add or update information or data of a customer relationship/resource management (CRM) component(s) with a generated match result.

FIG. 2 is an illustration of a drag and drop configuration for a wizard component(s) to automatically create a RPA workflow to add or update information or data of a customer relationship/resource management (CRM) component(s) with a generated match result 200. A wizard component(s) or module(s) may be configured to receive, accept, or utilize a model of data or data model for data or information to be added or fetched from a CRM component(s) or tool. This may be performed during design time to generate code or a RPA workflow to use by a robot in runtime in association with a data-table.

A wizard component(s) or module(s) may be part of or utilized with one or more robots during runtime in association with a RPA workflow. The data model may be in an excel file, a spreadsheet file, a data-table, RPA extracted data converted into a data-table, a table, or the like. Wizard component(s) may utilize defined objects, variables, activities, or the like corresponding to a CRM component(s) or tool. An algorithm may be configured to match between the data model provided and the objects of the CRM component(s). In addition, at least part of the match may involve user input. In certain configurations, the data model may act as a test component(s) for a wizard component(s) for improved design and reduced development time of a RPA automation or workflow.

In the example given herein, automatic creation of a workflow may entail a wizard component(s) adding a matching combo-box or list box activity. A wizard component(s) may configure these items as needed. Activities may comprise matching logic such as LIKE, CONTAINS, the Levenshtein distance between strings, and different other rules that assist with decisions on a best match for given information or data. In addition, certain fields such as reference field may be analyzed such that a wizard component(s) may add two activities: one for extracting the identification (ID) and Name from the reference object and other for matching. A wizard component(s) may add another activity that will do a loop operation on a data table in relation to a data connection. A wizard component(s) may know one or more activities to perform inside a loop, one or more activities to perform outside of the loop, or the like.

Data loading or feeding may be performed through a wizard component(s) such that big data or information is moved, altered, updated, or the like through RPA with high reliability. In addition, since drop down boxes with various values may confuse or trigger errors for one or more automation robots, a wizard component(s) may be configured to automate list selection and field population. Matching real values by a wizard component(s) may address field changes or variances that can be problematic for RPA. A wizard component(s) may also be configured to utilize different connectors to allow robots to load data to various platforms.

In certain configurations, if a field is labeled as "reference" and the data model has a label "Name", a wizard component(s) may be configured to extract the identification needed. Also, if the data model has a list, a wizard component(s) may be configured to match the data with accepted values, and convert raw data to the correct type of entrance, connector, or the like for the CRM component(s). A wizard component(s) may be configured to make decisions, fix data, fix errors, detect errors, correct data, test data, or the like.

In certain configurations, a wizard component(s) may be used with a REST application programming interface (API) protocol, a simple object access protocol (SOAP) API protocol, or the like. A protocol may be selected such that objects with Name, Type and other details are described for the wizard component(s). Error correction, as given herein, may be optimal or desirable when a protocol provides values for a combo-box, list, or another collection to select in a UI.

Configurations given herein may provide the capability to generate a workflow using a reduced or low number of clicks with better quality based on a provided data model for RPA automation. A wizard component(s) may be configured to work with a CRM component(s) or tools such as Salesforce, ServiceNow, or the like. In FIG. 2, application scope 202 may be configured to add information or data to a particular CRM component(s) or tool by a Do operation for wizard component(s) 204. A wizard component(s) 204 may utilize a loaded data model from file 206. The match component(s) 208 may be performed to generate match result 210 from wizard component(s) 204.

A CRM component(s) connector for an application or application platform may be utilized to add information or data to the CRM component. An application scope of particular CRM component(s) may be selected to drag and drop activities, objects, components, or the like into an application scope. An application scope may be configured to connect or communicate with a CRM component(s) and activities related to the CRM component(s) may operate or exist inside the application scope. Each CRM component(s) may be associated with a particular application scope and protocol to be utilized by a wizard component(s).

A popup, window, prompt, or the like may be configured to request examples of data to put or add into a CRM component(s) and corresponding data model needed by a wizard component(s). Selection or input of an Object/Entity for a destination of information or data to be added may also be requested. Selection of an action to perform with the information or data in the CRM component(s) may be configured for an update, delete, add, or the like actions. A generate a match may be subsequently performed. Part of a main command add, update, or the like may include checking activity and also if condition of an activity. In certain configurations, for a main ADD or UPDATE activity, a wizard component(s) may configure some or all parameters and protect some or all variables with a different function for protection and conversion regarding String, Text, or Date format.

A match result may include or detail how the fields such as Customer Name, Customer ID, E-mail, Phone Number, or the like in a data model match fields in a CRM component(s) or tool. Lists, combo-boxes, or the like of a UI may be analyzed by a wizard component(s). A wizard component(s) or underlying system may also be configured to analyze or detect fake information or data. If a misspelling exists in a data model field, a wizard component(s) may be configured for close matching and putting particular information into a specific field using a matching algorithm, Levenshtein distance, or the like. For instance, if a data model has the customer with the name 'Reteil' and the CRM component(s) contains the field as 'Retail', the analysis system may put 'Reteil' information from the data model to the 'Retail' column in the CRM component(s) using an automatically generated workflow or in coordination with the wizard component(s).

In addition, in a match generated by an algorithm, a wizard component(s) may perform various comparisons and utilize functions such as LIKE, Contains, a Levenshtein distance between strings, or the like. Matching may be configured such that a wizard component(s) provides or generates a list with ALL parameters available for a predetermined or given object. Code may be generated and workflow written based on or subsequent to a match result.

In certain configurations, a data model may be configured with column names on the first line and a wizard component(s) may be configured to read only information or data from a first worksheet of a workbook. Commands to be performed may be limited based on the number of available commands in a REST API. A wizard component(s) may utilize the REST API to communicate, make calls, send commands via a REST API, or the like in order to compare the structure of a data-table or data model to the structure of a CRM component(s).

Figure 3A:
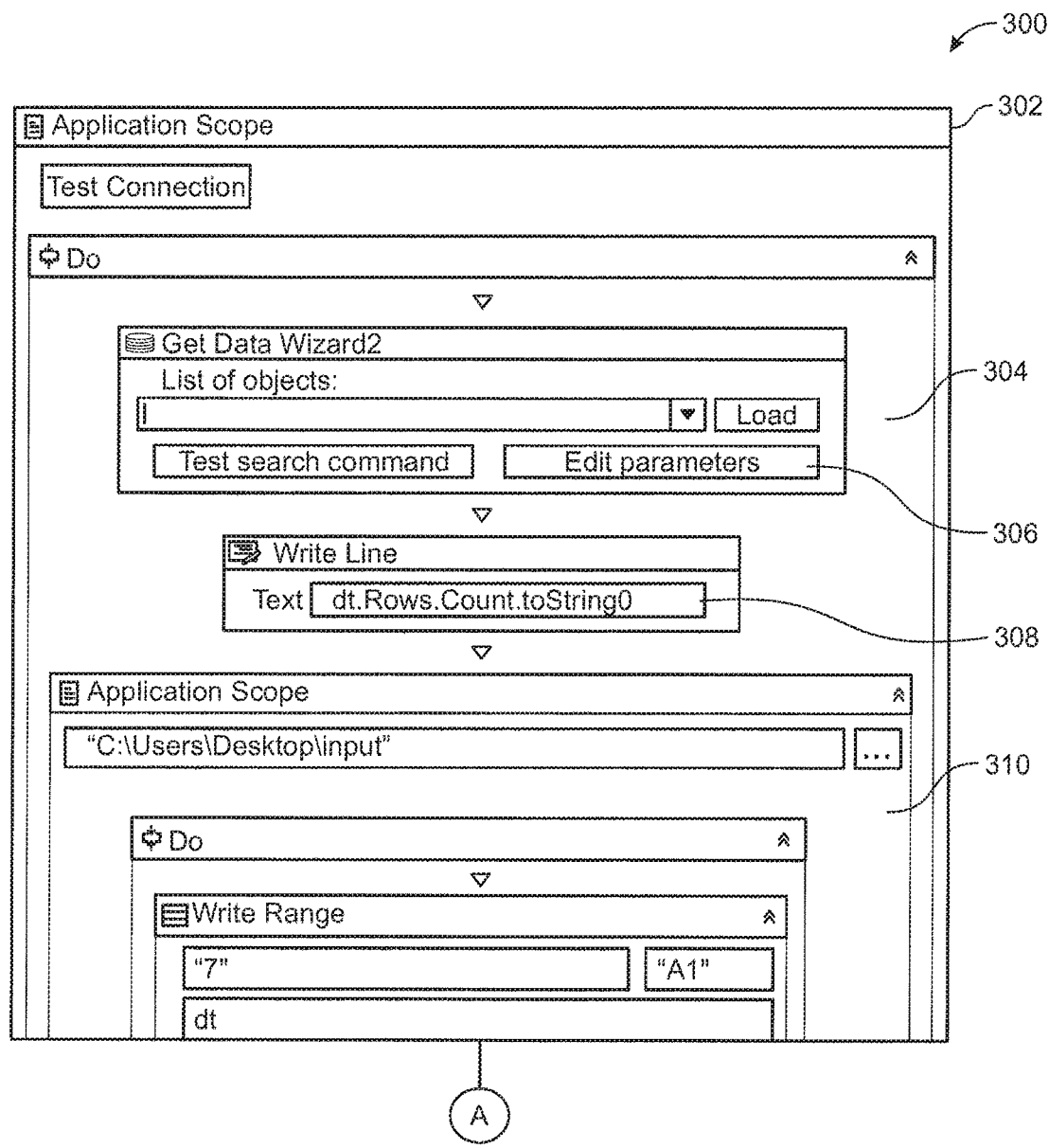
Figure 3B:
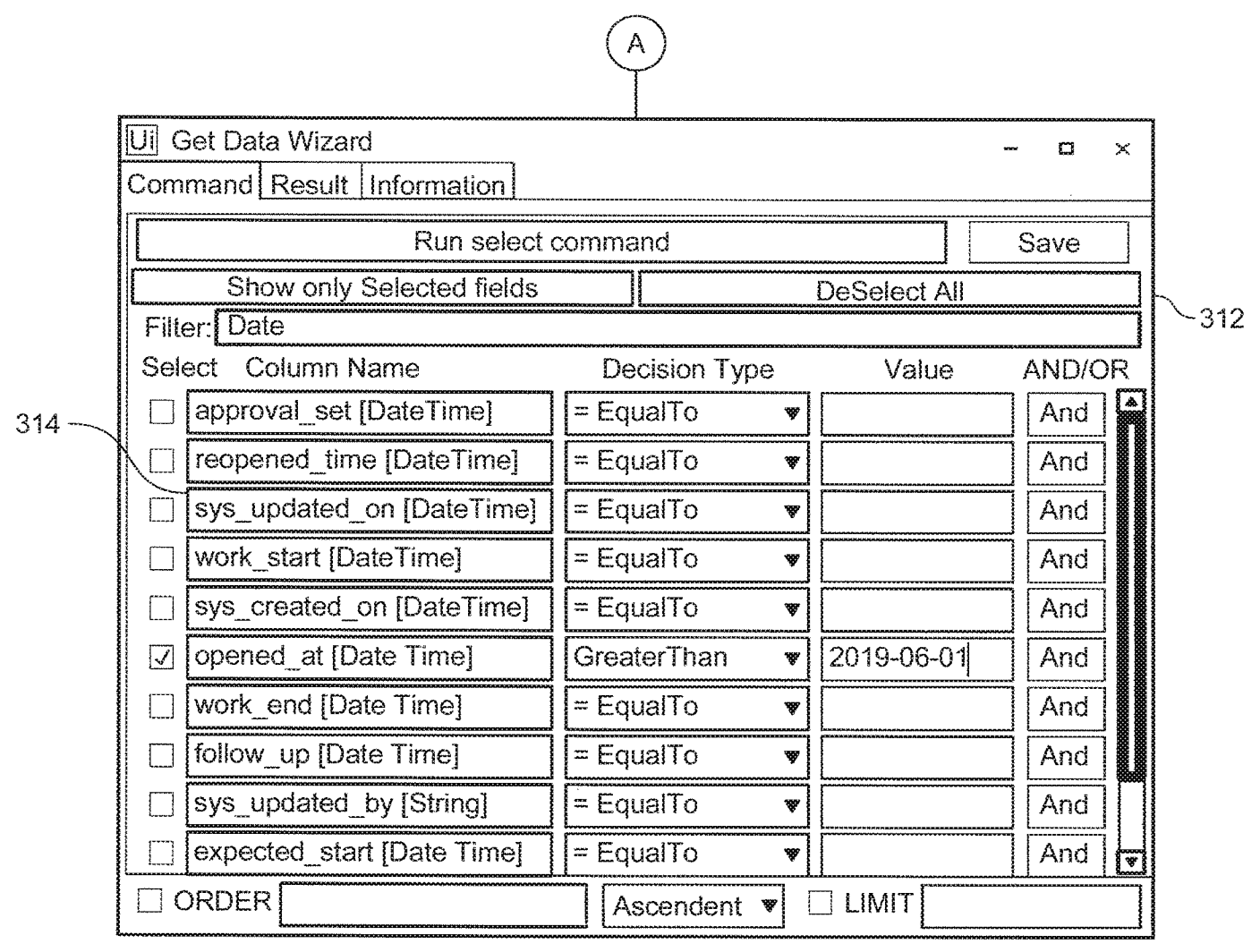

FIGS. 3A and 3B are illustrations of wizard components configured to automatically create RPA workflows to get information or data from CRM components 300. Application scope 302 for getting information or data from a particular CRM component(s) or tool may be performed by a Do operation 304 for Get Data wizard component(s) 306. Get Data wizard component(s) 306 may utilize write line operation 308. Drag and drop may be utilized for Get Data wizard component(s) 306 in application scope 302 to add additional RPA objects, commands, activities, or the like. Get Data wizard component(s) 306 may get incident data in addition to getting or retrieving other data. Application scope 310 may be configured to input retrieved data into a file, table, or the like.

Get Data wizard component(s) 306 may include "List of Objects" drop down list for selection. Subsequent to a Test Search Command operation, information related to the object selected may be returned (312). Various columns may be selected (314) to fetch from a CRM component(s) using a Run select command operation by RPA. An RPA robot may fetch the details, such as Decision Type, Value, etc., of the columns selected based on certain configurations.

FIG. 4 is an illustration of information results fetched by a wizard component(s) configured to automatically create a RPA workflow to get information or data 400 of a CRM component(s) for one or more selected columns. In FIG. 4, the results fetched may be based on the operation described in FIG. 3A or 3B. FIG. 5 is also an illustration of information results by a wizard component(s) configured to automatically create a RPA workflow to get information or data 500 of a CRM component(s). In FIG. 5, the results fetched may be based on the operation described in FIG. 3A or 3B from a command in design time inside a studio component.

For certain configurations, a Salesforce Activity package may be configured with a plurality of activities for a wizard component(s). A wizard component(s) may be configured to automatically create a RPA workflow to add, delete, update, get, or the like of main entities of a Salesforce package. This may be performed on main entities by a wizard component(s) with existing connections, new connections, existing authentication, new authentication, existing security sessions, new security sessions, or the like. A connection may be contained inside an application scope to be utilized by a wizard component(s). Security rules and access control may be configured inside the CRM component(s).

For authentication in Salesforce configurations, a wizard component(s) may request a password, token, consumer secret, secret question, or the like strings to use Get Secure Credential commands to initiate or perform an activity. Values or parameters for authentication may be obtained from a conductor. In certain configurations, a wizard component(s) may also be configured to obtain credentials for authentication using a Windows security component(s). During runtime, a robot(s) may utilize encrypted values for a password, token, client secret in secure string format, or the like in relation to a workflow(s).

Having a wizard component(s) for an activity may provide fast background, substantially background, substantially foreground, or the like automation independent of web browser or enterprise software layouts, improved testing during design of UI automation, reducing interactions between a robot and software component(s) that may reduce errors, or the like. Main entities may include account, asset, case, contact, lead, camping, file, opportunity, task, pricebook, product, product quote, or the like. For other tables in Salesforce and including customer, a package may include add, update, delete, or the like activities that may be utilized by any name, structure, object, custom object, or the like.

Moreover, to be able to get data from Salesforce tables or other enterprise component tables, a Get Data Wizard may be configured to view data, in real-time, and modify Salesforce Object Query Language (SOQL) commands during design. In addition, a list of all tables from a Salesforce instance may be obtained including details for all fields such as custom fields and tables. When adding data to Salesforce or another enterprise component(s), a wizard component(s) may dynamically perform a variety of tasks such as add a plurality of parameters, request any mandatory fields from the server during design time, get examples with random data to see all fields, search items by specific ID or Name, use variables as parameters inside a wizard component(s), test commands sent to Salesforce during design in preparation for the runtime, or the like.

When a custom object is arranged, a wizard component(s) may help automate or guide activities in an account entity such as add, delete, update, and get activities in relation to an activity. Thus, a workflow may be generated by a wizard component(s) to add, delete, or update an account; get accounts list; or add, delete, update, or get custom objects. Adding, assigning, or downloading a file may also be configured for a wizard component(s) to assist with generating a workflow for RPA automation.

For Salesforce configurations with a wizard component(s), a data table may be setup or defined for add, delete, or update Salesforce components, platforms, applications, or tools. The input included for the data table may be a string or list with arguments column name list, object_name, or the like. An object_name may be utilized with a defined data model for Salesforce configurations. The output generated may be the data table for a wizard component(s) to utilize for Salesforce configurations. An output may be a printed report generated based on the report activity and report identification.

For connecting to ServiceNow platform components, platforms, applications, tools, or the like a REST API may be used to perform RPA activities, workflows, or the like. Activities or operations may include add, delete, update, get, or the like. ServiceNow entities may include incident, problem, catalog, knowledge article, task, user, attachment, or the like. For add, update, delete, or the like activities of data in ServiceNow tables, including custom, a get data wizard component(s) may be configured to view data in real-time. The data wizard component(s) may also be configured to modify SQL commands during the design time in a studio.

If a list of all tables from a ServiceNow instance is available, a wizard component(s) may be configured to display details for a plurality of fields including custom fields and tables. To add data to ServiceNow, a wizard component(s) may be configured to add parameters, request mandatory fields from a server during design time, get examples with random data to see a plurality of fields, search items by specific ID or Name, use variables as parameters, or the like. A wizard component(s) may also be configured to test commands sent to ServiceNow during design time in a studio for runtime with a conductor, orchestrator, or the like. Testing during design time for RPA, in ServiceNow or other configurations, with a wizard component(s) may reduce implementation time, improve speed, reduce testing time, reduce development time, reduce error, or the like.

Figure 6:
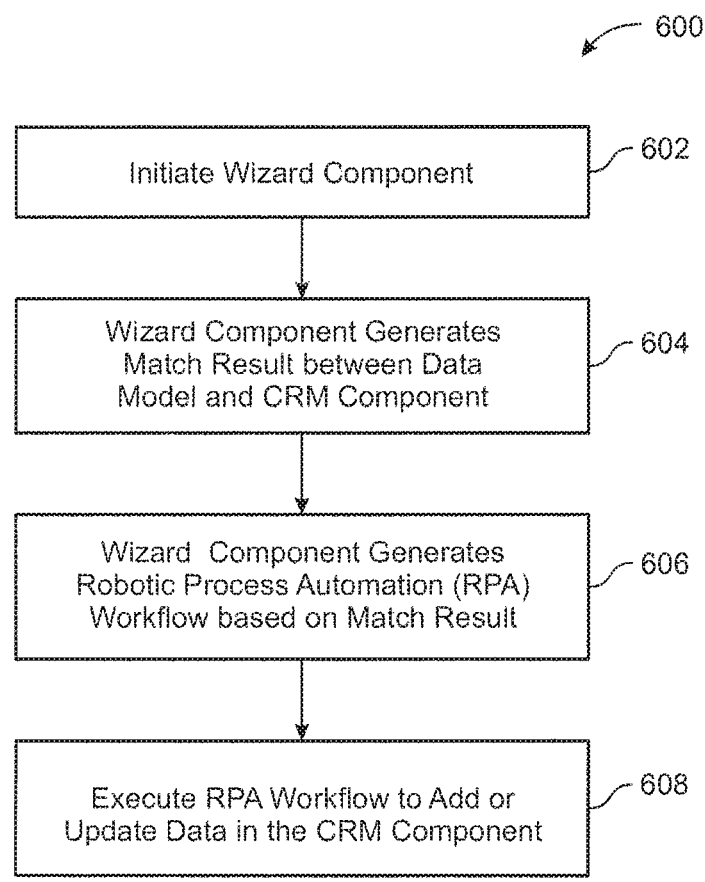
FIG. 6 is an illustration of a process of a wizard component(s) to automatically create a RPA workflow to get information or data from a CRM component(s).

FIG. 6 is an illustration of a process of a wizard component(s) to automatically create a RPA workflow to get information or data from a CRM component(s) 600. A wizard component(s) may be initiated, such as for a customer resource management (CRM) component (602). A wizard component(s) may generate a match result between a data model and the CRM component (604). The wizard component(s) may generate a RPA workflow based on the match result (606). The RPA workflow to add or update data in the CRM component may be executed.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A computing device comprising:
 a processor configured to initiate a wizard component for a customer resource management (CRM) component;
 a memory configured to store a data model;
 the processor configured to generate, using the wizard component, a match result between the data model and a plurality of fields of the CRM component; and
 the processor configured to generate, based on the match result by the wizard component, a robotic process automation (RPA) workflow, wherein the RPA workflow adds or updates first data in at least one of the plurality of fields of the CRM component based on a RPA activity component, and wherein the RPA workflow generation includes adding a matching combo-box or list box activity.

2. The computing device of claim 1, wherein another RPA workflow is generated, based on another data model, to retrieve second data from the plurality of fields of the CRM component.

3. The computing device of claim 1, wherein an application scope component for the CRM component is utilized to drag and drop an activity or object for the RPA workflow.

4. The computing device of claim 1, wherein the match result indicates at least one error in relation to the data model.

5. The computing device of claim 1, wherein the plurality of fields of the CRM component comprise at least one object to compare in the match result.

6. The computing device of claim 1, wherein the RPA activity component adds or updates a data field of the CRM component.

7. The computing device of claim 1 further comprising the processor configured to generate, using the wizard component, the match result based on one or more parameters of at least one of the plurality of fields of the CRM component.

8. A method performed by a computing device, the method comprising:
   initiating a wizard component for a customer resource management (CRM) component;
   storing a data model;
   generating, using the wizard component, a match result between the data model and a plurality of fields of the CRM component; and
   generating, based on the match result by the wizard component, a robotic process automation (RPA) workflow, wherein the RPA workflow adds or updates first data in at least one of the plurality of fields of the CRM component based on a RPA activity component, and wherein the RPA workflow generation includes adding a matching combo-box or list box activity.

9. The method of claim 8, wherein another RPA workflow is generated, based on another data model, to retrieve second data from the plurality of fields of the CRM component.

10. The method of claim 8, wherein an application scope component for the CRM component is utilized to drag and drop an activity or object for the RPA workflow.

11. The method of claim 8, wherein the match result indicates at least one error in relation to the data model.

12. The method of claim 8, wherein the plurality of fields of the CRM component comprises at least one object to compare in the match result.

13. The method of claim 8, wherein the RPA activity component adds or updates a data field of the CRM component.

14. The method of claim 8 further comprising generating, using the wizard component, the match result based on one or more parameters of at least one of the plurality of fields of the CRM component.

15. A computing device comprising:
   a processor configured to initiate a wizard component for a customer resource management (CRM) component;
   a memory configured to store a data model;
   the processor configured to generate, using the wizard component, a match result between the data model and a data field of the CRM component; and
   the processor configured to generate, based on the match result by the wizard component, a robotic process automation (RPA) workflow, wherein the RPA workflow adds or updates data in the data field of the CRM component based on a RPA activity component and based on one or more parameters of the data field, and wherein the RPA workflow generation includes adding a matching combo-box or list box activity.

16. The computing device of claim 15, wherein another RPA workflow is generated, based on another data model, to retrieve other data from a plurality of fields of the CRM component.

17. The computing device of claim 15, wherein an application scope component for the CRM component is utilized to drag and drop an activity or object for the RPA workflow.

18. The computing device of claim 15, wherein the match result indicates at least one error in relation to the data model.

* * * * *